United States Patent
Tanaka

(10) Patent No.: US 12,535,077 B2
(45) Date of Patent: Jan. 27, 2026

(54) ELECTRIC COMPRESSOR

(71) Applicant: IHI Corporation, Tokyo (JP)

(72) Inventor: Tohru Tanaka, Tokyo (JP)

(*) Notice: Subject to any disclaimer, the term of this patent is extended or adjusted under 35 U.S.C. 154(b) by 286 days.

(21) Appl. No.: 18/331,268

(22) Filed: Jun. 8, 2023

(65) Prior Publication Data

US 2023/0313806 A1    Oct. 5, 2023

Related U.S. Application Data

(63) Continuation of application No. PCT/JP2022/000261, filed on Jan. 6, 2022.

(30) Foreign Application Priority Data

Feb. 9, 2021   (JP) ................. 2021-019156

(51) Int. Cl.
*F04D 25/06*     (2006.01)
*F04D 29/051*    (2006.01)
(Continued)

(52) U.S. Cl.
CPC ......... *F04D 25/06* (2013.01); *F04D 25/0606* (2013.01); *F04D 29/051* (2013.01); *F04D 29/052* (2013.01); *F04D 29/059* (2013.01)

(58) Field of Classification Search
CPC .... F04D 25/06; F04D 25/0606; F04D 29/051; F04D 29/052; F04D 29/059
See application file for complete search history.

(56) References Cited

U.S. PATENT DOCUMENTS 2,209,109 A * 7/1940 Bungartz ............ F04D 29/146
  415/34
3,801,215 A * 4/1974 Osborne ............ F04D 29/049
  415/199.2
(Continued)

FOREIGN PATENT DOCUMENTS

EP    2860416    4/2015
JP    S56-081225    7/1981
(Continued)

OTHER PUBLICATIONS

International Preliminary Report on Patentability with Written Opinion dated Aug. 24, 2023 for PCT/JP2022/000261.
(Continued)

*Primary Examiner* — Christopher S Bobish
(74) *Attorney, Agent, or Firm* — SHIPWAY IP

(57) ABSTRACT

An electric compressor includes: a housing of an electric motor that is a power source of a compressor unit; a rotor that rotates inside the housing of the electric motor; a coil spring biasing the rotor in a rotation axis direction; a bearing interposed between the electric motor and the housing of the electric motor, and including an inner ring held by the rotor, and an outer ring biased by the coil spring to abut against an abutting portion of the housing of the electric motor; and a stopper that prohibits the rotor from displacing beyond a predetermined limit displacement amount against the biasing of the coil spring, and that allows the rotor to displace within the limit displacement amount. When the rotor is displaced to the limit displacement amount, the coil spring after being deformed has a closed height or more.

20 Claims, 5 Drawing Sheets

(51) Int. Cl.
*F04D 29/052* (2006.01)
*F04D 29/059* (2006.01)

(56) References Cited

U.S. PATENT DOCUMENTS

| | | | | |
|---|---|---|---|---|
| 4,767,265 A * | 8/1988 | Osterstom | ............ | F04D 19/042 |
| | | | | 384/114 |
| 4,822,241 A * | 4/1989 | Jarvis | ............ | F04D 29/167 |
| | | | | 415/129 |
| 6,971,801 B2 * | 12/2005 | Miyazaki | ............ | F16C 19/548 |
| | | | | 384/537 |
| 7,855,882 B2 * | 12/2010 | Franz | ............ | F04D 25/082 |
| | | | | 361/679.48 |
| 8,858,173 B2 * | 10/2014 | Marsal | ............ | F16C 27/04 |
| | | | | 415/229 |
| 9,695,708 B2 * | 7/2017 | Hettinger | ............ | F01D 25/164 |
| 9,976,476 B2 * | 5/2018 | Hettinger | ............ | F01D 25/164 |
| 10,662,963 B2 * | 5/2020 | Iizuka | ............ | F04D 29/056 |
| 10,927,844 B2 * | 2/2021 | Gashi | ............ | F04D 29/059 |
| 11,174,894 B2 * | 11/2021 | Otsuka | ............ | F04D 29/059 |
| 11,493,320 B2 * | 11/2022 | Sakawaki | ............ | F04D 17/10 |
| 11,506,212 B2 * | 11/2022 | Meares | ............ | F16C 33/3843 |
| 11,905,959 B2 * | 2/2024 | Tsuchida | ............ | F04D 25/082 |
| 2008/0031736 A1 * | 2/2008 | Liao | ............ | F04D 29/059 |
| | | | | 416/133 |
| 2016/0298490 A1 * | 10/2016 | Hettinger | ............ | F01D 25/164 |
| 2018/0080499 A1 * | 3/2018 | An | ............ | F16C 27/066 |
| 2019/0178257 A1 * | 6/2019 | Iizuka | ............ | F16C 35/063 |
| 2020/0248701 A1 * | 8/2020 | Meares | ............ | F04D 19/042 |

FOREIGN PATENT DOCUMENTS

| | | |
|---|---|---|
| JP | S63-009428 | 1/1988 |
| JP | 2013-253681 | 12/2013 |
| JP | 2014-159869 | 9/2014 |
| WO | 2016/194198 | 12/2016 |
| WO | 2018/043338 | 3/2018 |

OTHER PUBLICATIONS

International Search Report dated Mar. 8, 2022 for PCT/JP2022/000261.

* cited by examiner

ELECTRIC COMPRESSOR

CROSS-REFERENCE TO RELATED APPLICATIONS

This application is a continuation application of PCT Application No. PCT/JP2022/000261, filed on Jan. 6, 2022, which claims the benefit of priority from Japanese Patent Application No. 2021-019156, filed on Feb. 9, 2021. The entire contents of the above listed PCT and priority applications are incorporated herein by reference.

BACKGROUND

The present disclosure relates to an electric compressor.

In the related art, as a technique in such a field, a turbocharger described in Japanese Unexamined Utility Model Publication No. S63-009428 is known. In this turbocharger, a bearing is interposed between a rotor and a housing, and the rotor is supported by the bearing. In addition, the turbocharger includes a spring for pressurizing the bearing in an axial direction.

In rotary machines where the bearing is interposed between the rotor and the housing, the rotor may become displaced in the axial direction due to vibration. In that case, an inner ring of the bearing on a rotor side and an outer ring of the bearing on a housing side may be shifted in the axial direction, which may cause the bearing to become disassembled. The present disclosure describes an electric compressor including a bearing which maintains its structural integrity during vibration.

SUMMARY

An example electric compressor includes: a housing of a motor as a power source of a compressor unit; a rotor rotating around a predetermined rotation axis in the housing; a pressurizing spring biasing the rotor in a rotation axis direction; a rolling bearing that is interposed between the housing and the rotor, and includes: an inner ring held by the rotor; and an outer ring biased by the pressurizing spring to abut against a predetermined abutting portion of the housing in the rotation axis direction; and a stopper that prohibits the rotor from displacing beyond a predetermined limit displacement amount against a biasing of the pressurizing spring, and that allows the rotor to displace within the limit displacement amount, wherein, when the rotor is displaced to the limit displacement amount, the pressurizing spring after being deformed has a height that is equal to or more than a closed height of the pressurizing spring.

According to the electric compressor of the present disclosure, a bearing maintains its structural integrity during vibration.

DETAILED DESCRIPTION

Figure 1:
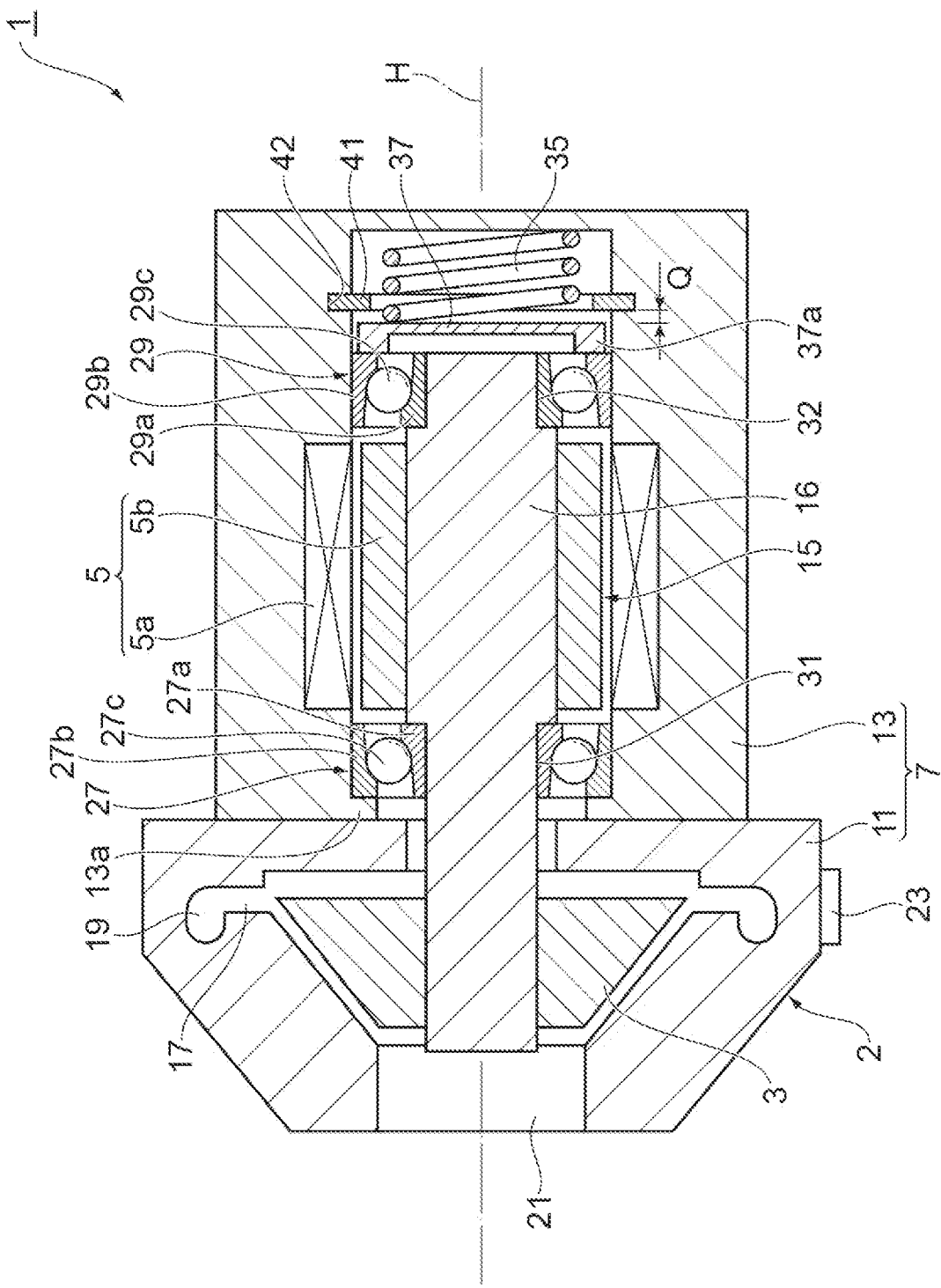
FIG. 1 is a cross-sectional view schematically showing an electric compressor according to the present embodiment.

An example electric compressor includes: a housing of a motor as a power source of a compressor unit; a rotor rotating around a predetermined rotation axis in the housing; a pressurizing spring biasing the rotor in a rotation axis direction; a rolling bearing that is interposed between the housing and the rotor, and includes: an inner ring held by the rotor; and an outer ring biased by the pressurizing spring to abut against a predetermined abutting portion of the housing in the rotation axis direction; and a stopper that prohibits the rotor from displacing beyond a predetermined limit displacement amount against a biasing of the pressurizing spring, and that allows the rotor to displace within the limit displacement amount, wherein, when the rotor is displaced to the limit displacement amount, the pressurizing spring after being deformed has a height that is equal to or more than a closed height of the pressurizing spring.

In addition, in the electric compressor of the present disclosure, where the height of the pressurizing spring after being deformed when the rotor is displaced to the limit displacement amount is L, a free height of the pressurizing spring is L0, and the closed height of the pressurizing spring is Lc, $20\% \leq (L0-L)/(L0-Lc) \leq 80\%$ may be satisfied.

In addition, the limit displacement amount may be smaller than a minimum shift amount at which a dislocation of the rolling bearing occurs when the inner ring and the outer ring of the rolling bearing are shifted relative to each other in the rotation axis direction. The rolling bearing may be an angular contact ball bearing installed in a direction that supports a thrust force in a biasing direction of the pressurizing spring. In addition, in the electric compressor of the present disclosure, when the rotor is displaced to the limit displacement amount, the pressurizing spring after being deformed may be in a state of maintaining an elastic repulsive force.

The stopper may be provided in the housing, and the displaced rotor directly or indirectly interferes with the stopper. In addition, the stopper may be a retaining ring member that is fitted in a groove extending in a circumferential direction in an inner peripheral surface of the housing. In addition, the stopper may be directly or indirectly provided on the rotor, and displaces together with the rotor to interfere with the housing.

An example electric compressor includes: a housing accomadating a motor; a rotor that includes a rotation shaft and rotates around a rotation axis in the housing; a pressurizing spring that biases the rotor in a rotation axis direction from a second end of the housing to a first end of the housing; a first rolling bearing interposed between the housing and the rotor in a radial direction, a retainer interposed between the rotor and the second end of the housing in the rotation axis direction, and a stopper that is interposed between the retainer and the second end of the housing in the rotation axis direction with a gap between the retainer and the stopper, wherein the gap corresponds a predetermined limit displacement amount of the rotor.

When the rotor is displaced to the limit displacement amount, the pressurizing spring after being deformed may have a height that is equal to or more than a closed height of the pressurizing spring.

The height L of the pressurizing spring after being deformed when the rotor is displaced to the limit displacement amount, a free height L0 of the pressurizing spring, and the closed height Lc of the pressurizing spring may satisfy the following expression.

$$20\% \leq (L0-L)/(L0-Lc) \leq 80\%$$

The first rolling bearing may include: an inner ring provided on a first small diameter portion of the rotor; an outer ring biased by the pressurizing spring to abut against an abutting portion of the housing in the rotation axis direction, wherein the abutting portion protrudes inward in the radial direction from an inner peripheral surface of the housing; and a bearing ball provided between the inner ring and the outer ring in the radial direction, and the limit displacement amount may be smaller than a minimum shift amount at which the bearging ball of the first rolling bearing is dislocated when the inner ring and the outer ring are shifted in opposite way on the rotation axis direction.

The inner ring of the first rolling bearing may be interference-fitted to the first small diameter portion of the rotor, and the outer ring of the first rolling bearing may be clearance-fitted to the inner peripheral surface of the housing.

The first rolling bearing may further include an O-ring that extends in a circumferential direction and is sandwiched between an outer peripheral surface of the outer ring and the inner peripheral surface of the housing. The example electric compressor may further include a second rolling bearing interposed between the first rolling bearing and the retainer in the rotation axis direction, wherein, the second rolling bearing include: an inner ring provided on a second small diameter portion of the rotor, wherein an end surface of the inner ring abuts against a step of the second small diameter portion; an outer ring that is slidable in the rotation axis direction with respect to an inner peripheral surface of the housing; and a bearing ball provided between the inner ring and the outer ring in the radial direction.

The inner ring of the second rolling bearing may be interference-fitted to the second small diameter portion of the rotor, and the outer ring of the second rolling bearing may be clearance-fitted to the inner peripheral surface of the housing.

The retainer may be interposed between the second rolling bearing and the stopper in the rotation axis direction, wherein the retainer includes a protruding portion that protrudes in the rotation axis direction towards the outer ring of the second rolling bearing, and wherein the retainer is biased by the pressurizing spring to abut against the outer ring of the second rolling bearing.

The stopper may have a ring shape and be interposed between the retainer and the second end of the housing in the rotation axis direction along an inner peripheral surface of the housing.

The stopper may be a step provided on an inner peripheral surface of the housing between the retainer and the second end of the housing in the rotation axis direction.

An example electric compressor includes: a housing accomadating a motor; a rotor that includes a rotation shaft and rotates around a rotation axis in the housing; a pressurizing spring that biases the rotor in a rotation axis direction from a second end of the housing to a first end of the housing; a first rolling bearing interposed between the housing and the rotor in a radial direction, a retainer interposed between the rotor and the second end of the housing in the rotation axis direction, and a stopper that is interposed between the retainer and the second end of the housing with a gap between the stopper and the second end of the housing, wherein the gap corresponds a predetermined limit displacement amount of the rotor.

Hereinafter, an electric compressor 1 according to an embodiment of the present disclosure will be described with reference to the drawings. FIG. 1 is a cross-sectional view schematically showing the electric compressor 1 according to the present embodiment. It should be noted that since features relevant to the description may be exaggeratedly shown in each drawing, the dimensional proportions of each part may not necessarily coincide between the drawings.

The electric compressor 1 is equipped in, for example, in a vehicle, an aircraft, or the like. For example, when the electric compressor 1 is equipped in a vehicle as a part of a two-stage turbocharger, the electric compressor 1 is used to compress air in a preceding stage of a turbocharger, and to supply the compressed air to the turbocharger. In the following description, an "axial direction", a "radial direction", and a "circumferential direction" being simply referred mean an axial direction, a radial direction, and a circumferential direction of rotation of an impeller 3 to be described later, respectively. In addition, in the following description, when terms such as "front" and "rear" are used, a compressor unit 2 side (left side in FIG. 1) and an electric motor 5 side (right side in FIG. 1) to be described later in the axial direction are a front side and a rear side, respectively.

The electric compressor 1 includes a compressor unit 2 that compresses air. The compressor unit 2 includes the impeller 3 that rotates around a rotation axis H, and an impeller housing 11 that accommodates the impeller 3. In addition, the electric compressor 1 includes an electric motor 5 as a power source for the rotation of the impeller 3. In addition, the electric compressor 1 includes a housing 7 that accommodates the impeller 3 and the electric motor 5. The housing 7 includes the impeller housing 11 that accommodates the impeller 3 as described above, and a motor housing 13 that accommodates the electric motor 5. It should be noted that the impeller housing 11 and the motor housing 13 are each composed of a plurality of components, and the components forming each housing or how to combine the components can be freely designed.

The impeller housing 11 and the motor housing 13 are connected in the direction of the rotation axis H. A rotor 15 extending from the inside of the impeller housing 11 to the inside of the motor housing 13 exists on the rotation axis H. The impeller 3 is provided at a front end of the rotor 15, and the rotor 15 is rotated by a driving force of the electric motor 5. The electric motor 5 includes a coil 5a provided in the motor housing 13, and a magnet 5b provided on the rotor 15. The rotor 15 includes a rotation shaft 16, the magnet 5b and the impeller 3.

The impeller housing 11 includes a diffuser 17 provided to face an outer peripheral side of an outlet of the impeller 3. In addition, the impeller housing 11 includes a scroll 19 provided on an outer peripheral side of the diffuser 17. In addition, the impeller housing 11 includes an inlet port 21 that opens toward the outside at a position facing an inlet of the impeller 3 in the axial direction, and an outlet port 23 that is an outlet of the scroll 19.

When electric power is supplied to the electric motor 5, the impeller 3 is rotated inside the impeller housing 11 by the rotation of the rotor 15. Accordingly, outside air is suctioned to the impeller 3 in the axial direction through the inlet port 21, and is discharged outward in the radial direction from the outlet of the impeller. The air from the outlet of the impeller flows into the diffuser 17, and is compressed through the diffuser 17 and the scroll 19. The compressed air is supplied to the turbocharger through the outlet port 23.

Subsequently, a bearing structure of the rotor 15 will be described. The electric compressor 1 includes two bearings 27 and 29 (rolling bearings) that support the rotor 15. The bearings 27 and 29 are disposed to interpose the electric motor 5 therebetween in the axial direction, and are interposed between an outer peripheral surface of the rotor 15 and an inner peripheral surface of the motor housing 13. In the axial direction, the bearing 27 is located between the electric motor 5 and the impeller 3, and the bearing 29 is located at a rear end portion of the rotor 15.

An inner ring 27a of the bearing 27 is fitted to the outer peripheral surface of the rotor 15 via an interference fit (close-fit, tight fit, stationary-fit). In the present embodiment, the inner ring 27a is interference-fitted to a small-diameter portion 31 provided in the rotor 15. This configuration prevents the inner ring 27a from moving in the axial direction with respect to the rotor 15. On the other hand, an outer ring 27b of the bearing 27 is fitted to the inner peripheral surface of the motor housing 13 via a clearance fit (loose fit). Then, an abutting portion 13a (abutting part) is provided at a front end of the inner peripheral surface of the motor housing 13. The abutting portion 13a protrudes inward in the radial direction from the inner peripheral surface of the motor housing 13, and a front end surface of the outer ring 27b abuts against the abutting portion 13a in the axial direction. According to this configuration, the outer ring 27b is slidable in the axial direction with respect to the inner peripheral surface of the motor housing 13, but the forward movement of the outer ring 27b is restricted by the abutting portion 13a.

Figure 2:
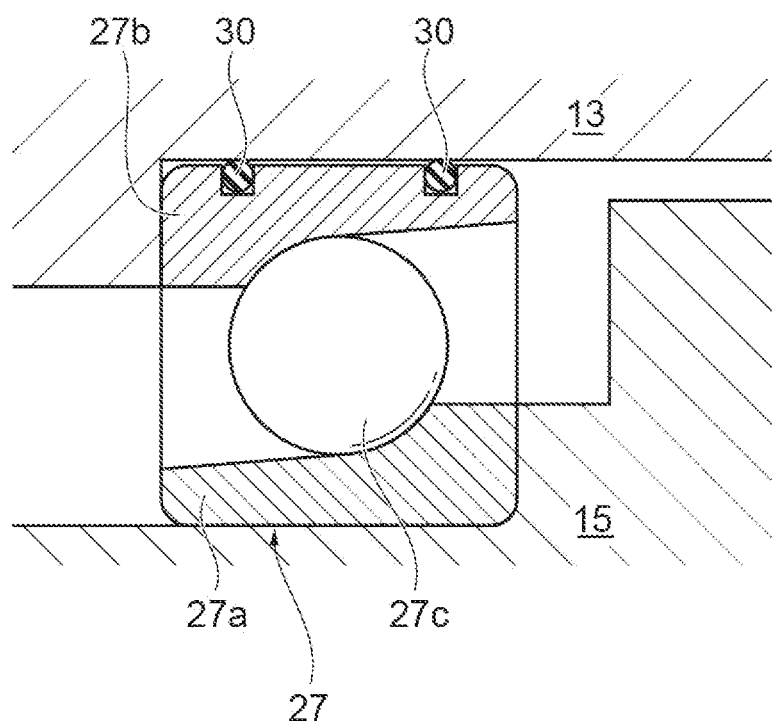
FIG. 2 is a cross-sectional view showing one example of the vicinity of a bearing of the electric compressor in FIG. 1.

It should be noted that for the purpose of preventing creep of the outer ring 27b, the bearing 27 may be provided on the motor housing 13 via an O-ring. Namely, as shown in FIG. 2, O-rings 30 extending in the circumferential direction may be sandwiched between an outer peripheral surface of the outer ring 27b and the inner peripheral surface of the motor housing 13.

As shown in FIG. 1, an inner ring 29a of the bearing 29 is fitted to the outer peripheral surface of the rotor 15 via an interference fit (close-fit, tight fit, stationary-fit). Further, the inner ring 29a is fitted to a small-diameter portion 32 provided at a rear end of the rotor 15, and a front end surface of the inner ring 29a abuts against a step of the small-diameter portion 32. This configuration prevents the inner ring 29a from moving in the axial direction with respect to the rotor 15. On the other hand, since an outer ring 29b of the bearing 29 is fitted to the inner peripheral surface of the motor housing 13 via a clearance fit (loose fit), the outer ring 29b is slidable in the axial direction with respect to the inner peripheral surface of the motor housing 13. It should be noted that similarly to the bearing 27, the bearing 29 may be provided on the motor housing 13 via an O-ring.

In addition, for the bearings 27 and 29, angular contact ball bearings are employed to have both the functions of a radial bearing and a thrust bearing. The bearing 27 is installed in a direction that supports a thrust force toward the front of the rotor 15 (thrust force in a direction from the electric motor 5 toward the impeller 3). Namely, when the inner ring 27a of the bearing 27 receives a forward thrust force from the rotor 15, the thrust force is transmitted to the outer ring 27b via balls 27c. In addition, the bearing 29 is installed in a direction that supports a thrust force toward the rear of the rotor 15 (thrust force in a direction from the impeller 3 toward the electric motor 5). Namely, when the inner ring 29a of the bearing 29 receives a rearward thrust force from the rotor 15, the thrust force is transmitted to the outer ring 29b via balls 29c.

A compression coil spring 35 (pressurizing spring) that expands and contracts in the axial direction to pressurize the rotor 15, and a retainer 37 biased forward by the coil spring 35 are installed in a space behind the rotor 15 inside the motor housing 13. The retainer 37 has a disc shape, and includes a protruding portion 37a protruding forward along a front edge of the retainer 37. A front end surface of the protruding portion 37a abuts against a rear end surface of the outer ring 29b of the bearing 29. According to this structure, the outer ring 29b of the bearing 29 is biased forward via the retainer 37 by a biasing force of the coil spring 35.

According to the bearing structure described above, when the outer ring 29b is pushed forward via the retainer 37 by the biasing force of the coil spring 35, the inner ring 29a is pushed forward via the balls 29c. In that case, since the inner ring 29a is interference-fitted to the rotor 15, the rotor 15 is pushed forward. Then, since the inner ring 27a of the bearing 27 is interference-fitted to the rotor 15, the inner ring 27a of the bearing 27 is pushed forward. Then, since the inner ring 27a is pushed forward, the outer ring 27b is pushed forward via the balls 27c, and the outer ring 27b is pressed against the abutting portion 13a of the motor housing 13. In this manner, as in the state shown in FIG. 1, the rotor 15, the bearings 27 and 29, and the retainer 37 are aligned by being abutted against the abutting portion 13a by the biasing force of the coil spring 35. The state shown in FIG. 1 where the rotor 15, the bearings 27 and 29, and the retainer 37 are aligned in this manner is referred to as an "initial state", and the position of each part in the initial state is referred to as an "initial position".

In addition, the rotor 15 is displaceable rearward from the initial position against the biasing of the coil spring 35. In order to restrict a displacement amount of the rotor 15 to a predetermined value or less, a stopper 41 is provided behind the retainer 37 with a gap interposed therebetween. The stopper 41 prohibits the rotor 15 from displacing beyond a predetermined limit displacement amount Q, and allows the rotor 15 to displace within the limit displacement amount Q. The limit displacement amount Q corresponds to the amount of an axial gap between a rear end surface of the retainer 37 and the stopper 41 in the initial state.

The stopper 41 is formed as a retaining ring member (snap ring). Specifically, a groove 42 extending in the circumferential direction is formed in the inner peripheral surface of the motor housing 13. The stopper 41 is a C-shaped retaining ring member having a shape obtained by cutting out a part of a ring. During the assembly of the electric compressor 1, the stopper 41 is installed by compressing the diameter of the stopper 41, inserting the stopper 41 into the inside of the motor housing 13, and fitting the stopper 41 into the groove 42. Then, since the width in the radial direction of the stopper 41 is wider than the depth of the groove 42, an inner peripheral portion of the stopper 41 protrudes inward from the inner peripheral surface of the motor housing 13. With this configuration, when the rotor 15 is displaced to the limit displacement amount Q, the stopper 41 interferes with the retainer 37, and the rotor 15 is prohibited from further moving rearward. By configuring the stopper 41 as a retaining ring member described above, the assembly and disassembly of the part of the stopper 41 are facilitated.

Here, in applications in which the electric compressor 1 is equipped in a vehicle or an aircraft, an impact load can be applied to the electric compressor 1 during operation. In this case, an axial inertia force is generated in the rotor 15 due to an axial component of vibration caused by the impact load. According to the above bearing structure, a forward inertia force is supported by the abutting portion 13a of the motor housing 13, and the rotor 15 does not displace from the initial position. On the other hand, when a rearward inertia force acts, the inertia force is supported by the coil spring 35, and the coil spring 35 is compressed, so that the rotor 15 displaces rearward from the initial position. In this manner, during vibration of the electric compressor 1, the rotor 15 displaces in the axial direction, but the displacement amount of the rotor 15 is limited to the limit displacement amount Q or less.

Figure 3:
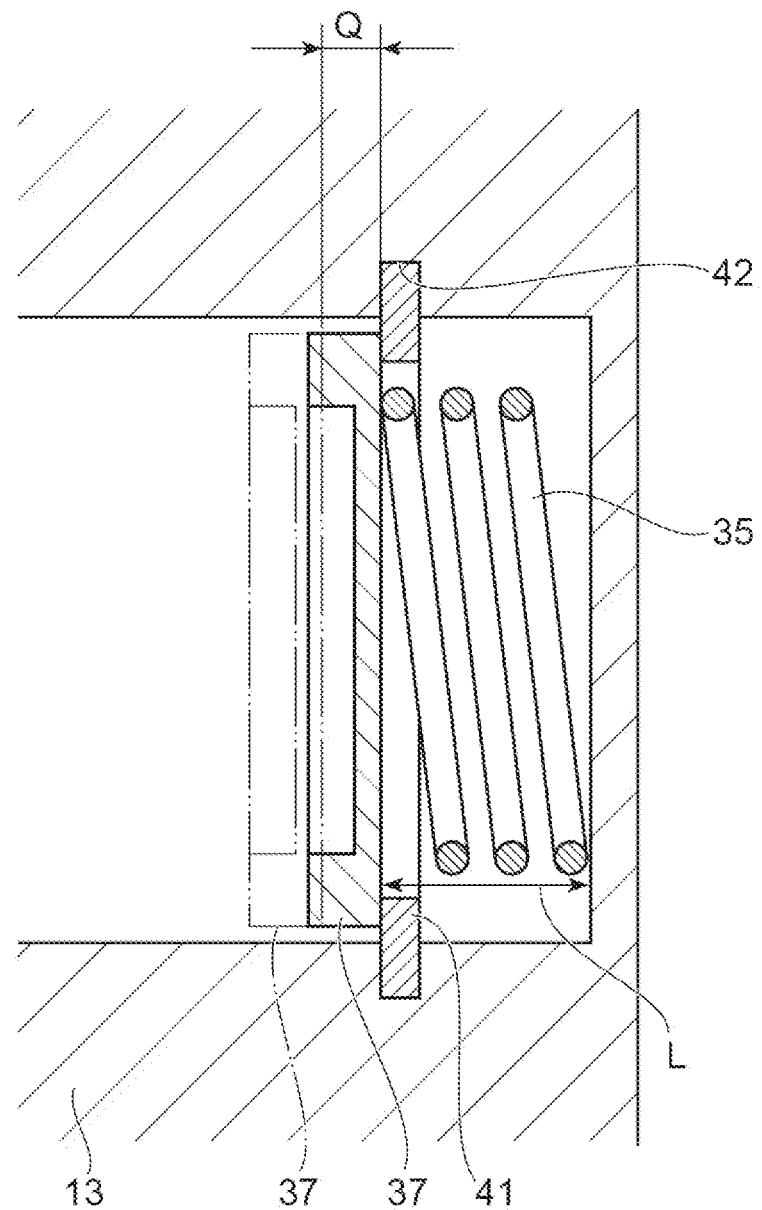
FIG. 3 is a cross-sectional view showing a retainer, a stopper, and a coil spring in a limit displacement state.

Subsequently, the setting of the limit displacement amount Q described above will be described with reference to FIG. 3. FIG. 3 is a cross-sectional view showing the retainer 37, the stopper 41, and the coil spring 35 in a limit displacement state, and components other than components required for description are not depicted. In addition, in FIG. 3, the retainer 37 in the initial state is indicated by a chain double-dashed line. Hereinafter, the state where the rotor 15 is displaced by the limit displacement amount Q (namely, a state where the retainer 37 is abutted against the stopper 41) is referred to as the "limit displacement state", and the position of the rotor 15 in the limit displacement state is referred to as a "limit displacement position".

As described above, since the limit displacement amount Q corresponds to the amount of the axial gap between the rear end surface of the retainer 37 and the stopper 41 in the initial state, the limit displacement amount Q is appropriately set by appropriately setting the location of the stopper 41. The arrangement of the stopper 41 is set to satisfy all the following conditions C1 to C4.

[Condition C1]

A length L of the coil spring 35 in the limit displacement state is a length equal to or more than a closed height (solid height) of the coil spring 35.

Namely, the coil spring 35 in the limit displacement state still has the capacity to be further compressed in the axial direction. If the stopper 41 is not provided, the retainer 37 can further compress the coil spring 35 from the limit displacement state, and is displaceable rearward.

Here, when the usage state of the coil spring 35 is designed according to Section 6.1 of JIS B 2704-1:2018, a length L1 of the coil spring 35 when in use satisfies the following Equation (1).

$$20\% \leq (L0-L1)/(L0-Lc) \leq 80\% \quad (1)$$

Therefore, in this case, as one example of the range that satisfies condition C1, the length L of the coil spring 35 in the limit displacement state is set within a range that satisfies the following Equation (2), namely, the disposition of the stopper 41 is set to satisfy the following Equation (2).

$$20\% \leq (L0-L)/(L0-Lc) \leq 80\% \quad (2)$$

Here, in Equations (1) and (2), L0 is a free height of the coil spring 35, and Lc is the closed height of the coil spring 35.

The "closed height" of the coil spring 35 in condition C1 may be obtained through pre-testing. In addition, in the case where a commercially available generic product is employed as the coil spring 35, the "closed height" in condition C1 may be obtained based on the specifications of the generic product. It should be noted that the "closed height" in condition C1 means a "closed height" defined in JIS B 2704-1:2018.

[Condition C2]

The limit displacement amount Q is smaller than a minimum shift amount (hereinafter, referred to as a) at which a dislocation (displacement, misalignment, dismantlement, disassembly, cage escape, ball out, ball ejection) occurs in the bearing 27 when the inner ring 27a and the outer ring 27b of the bearing 27 are shifted relative to each other in the axial direction.

Namely, even in the case where the inner ring 27a and the outer ring 27b of the bearing 27 are shifted relative to each other in the axial direction, when the shift amount therebetween is smaller than a, a dislocation does not occur in the bearing 27. The minimum shift amount a between the inner ring 27a and the outer ring 27b at which a dislocation occurs in the bearing 27 may be obtained through pre-testing.

[Condition C3]

The coil spring 35 in the limit displacement state is in the state of maintaining an elastic repulsive force.

Namely, the deformation state of the coil spring 35 in the limit displacement state is within an elastic deformation region, and when the rotor 15 moves forward, the coil spring 35 elastically returns. The coil spring 35 reversibly and elastically deforms between the initial state and the limit displacement state. The range of "the state of maintaining an elastic repulsive force" in condition C3 may be obtained through pre-testing. In addition, in the case where a commercially available generic product is employed as the coil spring 35, the range of the "state of maintaining an elastic repulsive force" in condition C3 may be obtained based on the specifications of the generic product.

[Condition C4]

When the rotor 15 thermally expands in the axial direction relative to the motor housing 13, an axial gap remains between the rear end surface of the retainer 37 and the stopper 41 in the initial state.

Each of the rotor 15 and the motor housing 13 thermally expands in the axial direction due to heat generated during operation of the electric compressor 1. At this time, when the rotor 15 expands in the axial direction more than the motor housing 13, the difference in thermal expansion is absorbed by the contraction of the coil spring 35. According to condition C4, even when the thermal expansion of the rotor 15 in the axial direction with respect to the motor housing 13 has reached its maximum, an axial gap still remains between the rear end surface of the retainer 37 and the stopper 41.

Subsequently, actions and effects of the electric compressor 1 will be described. In the electric compressor 1, the stopper 41 is provided in an arrangement that satisfies conditions C1 to C4.

Figure 4A:
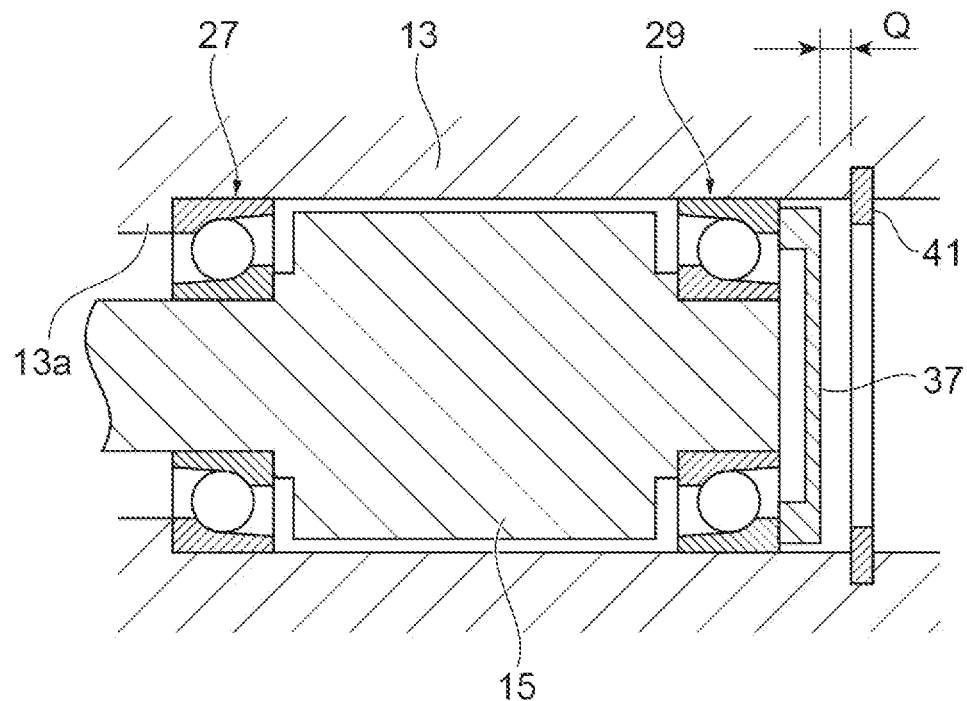
FIGS. 4A and 4B are cross-sectional views each showing positional relationships among a rotor, bearings, and the like in the initial state and in the limit displacement state.
Figure 4B:
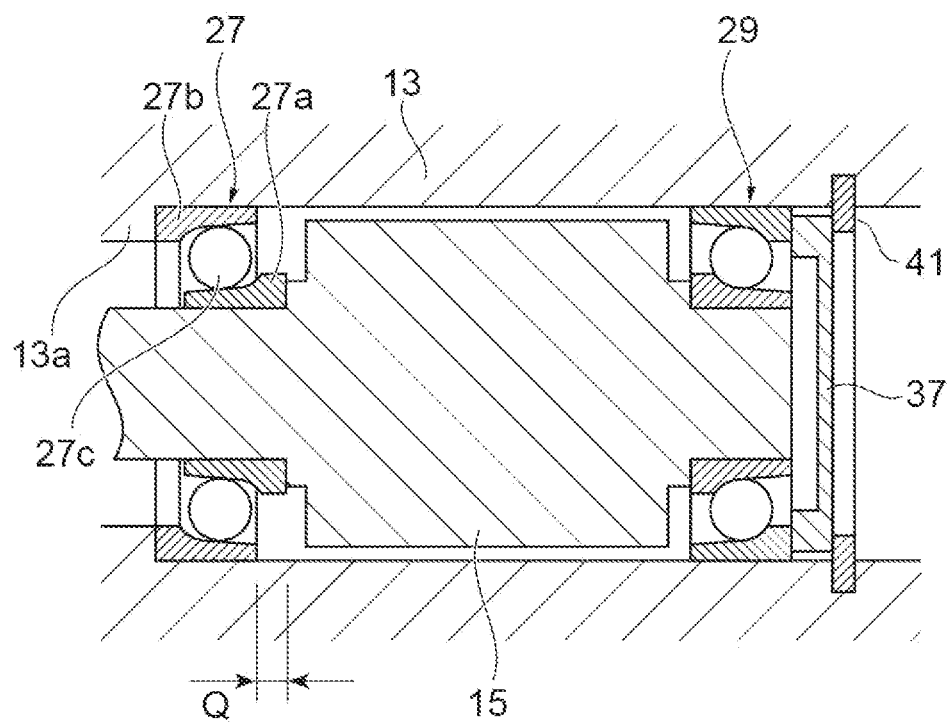

The actions and effects of satisfying condition C2 are as follows. FIG. 4A shows a positional relationship between the rotor 15, the bearings 27 and 29, and the like in the initial state, and FIG. 4B shows a positional relationship between the rotor 15, the bearings 27 and 29, and the like in the limit displacement state. In FIGS. 4A and 4B, components other than components required for description are not depicted. During operation of the electric compressor 1, due to differences in thermal expansion among components and the like, the outer ring 27b of the bearing 27 may be interference-fitted to the motor housing 13. Alternatively, when the O-rings 30 (refer to FIG. 2) exist between the outer ring 27b and the motor housing 13, the outer ring 27b and the motor housing 13 may not slide smoothly in the axial direction due to a frictional force of the O-rings 30.

When it is considered a state where a rearward inertia force acts on the rotor 15 in this state and the rotor 15 is displaced by the limit displacement amount Q, as shown in FIG. 4B, the rotor 15, the bearing 29, and the inner ring 27a of the bearing 27 displace rearward, whereas the outer ring 27b is fixed to the motor housing 13, and cannot follow the displacement. As a result, the inner ring 27a displaces rearward in the axial direction with respect to the outer ring 27b, namely, the inner ring 27a and the outer ring 27b are shifted in the axial direction. Then, as shown in FIG. 4B, the shift amount is the limit displacement amount Q at maximum.

Here, due to the nature of the angular contact ball bearing, when the shift amount in the axial direction between the inner ring 27a and the outer ring 27b is a or more, there is a high possibility that a dislocation of the ball 27c occurs and the bearing 27 is disassembled. On the other hand, in the electric compressor 1, since the limit displacement amount Q is made smaller than a by satisfying condition C2, the displacement amount of the rotor 15 during operation is suppressed to a value smaller than a, and as a result, it is avoided that the shift amount in the axial direction between the inner ring 27a and the outer ring 27b becomes a or more. Therefore, the disassembly of the bearing 27 during operation is avoided.

Here, when it is considered a state where condition C1 is not satisfied, the coil spring 35 is compressed to the closed height before the retainer 37 interferes with the stopper 41. In that case, the coil spring 35 cannot be further contracted, and the retainer 37 is prohibited from further displacing rearward. Therefore, when condition C1 is not satisfied, the retainer 37 does not interfere with the stopper 41, and the stopper 41 does not have any function. On the other hand, in the electric compressor 1, by satisfying condition C1, when the rotor 15 is displaced rearward during operation, the stopper 41 inhibits the rotor 15 from displacing rearward before the coil spring 35 reaches the closed height.

In addition, when the above-described Equation (2) in condition C1 is not satisfied (particularly, when (L0−L)/(L0−Lc) is more than 80%), the length L1 of the coil spring 35 deviates from the range of the above-described Equation (1) before the retainer 37 interferes with the stopper 41, which is not preferable. On the other hand, in the electric compressor 1, in the case where Equation (2) is satisfied, when the rotor 15 is displaced rearward during operation, the stopper 41 inhibits the rotor 15 from displacing rearward before the length L1 of the coil spring 35 deviates from the range of Equation (1). Therefore, the deformation amount of the coil spring 35 can be suppressed within the range according to Section 6.1 of JIS B 2704-1:2018.

In addition, by satisfying condition C3, even when the rotor 15 is displaced by the limit displacement amount Q, the deformation of the coil spring 35 beyond the elastic deformation region is avoided. As a result, damage to the coil spring 35, such as irreversible deformation remaining, is avoided. In addition, by satisfying condition C4, a difference in thermal expansion in the axial direction between the rotor 15 and the motor housing 13 that thermally expand during operation can be absorbed by the gap between the rear end surface of the retainer 37 and the stopper 41.

It should be noted that in order to suppress the shift amount in the axial direction between the inner ring 27a and the outer ring 27b of the bearing 27 during operation, instead of providing the stopper 41, a configuration in which the spring stiffness of the coil spring 35 is increased can also be employed. However, according to this configuration, it is necessary to manage the set dimensions of the coil spring 35 with high accuracy, which can be a factor that increases the manufacturing cost of the electric compressor 1. In addition, when the spring stiffness of the coil spring 35 is increased, the reaction force of the coil spring 35 generated by a dimensional change due to thermal expansion or the like increases. In that case, since friction between the balls 27c, the inner ring 27a, and the outer ring 27b of the bearing 27 increases, thermal degradation of grease also increases, so that the lifespan of the bearing 27 is shortened. Similarly, the lifespan of the bearing 29 is also shortened. On the other hand, according to the electric compressor 1, the above problems are avoided.

The present disclosure can be implemented in various modes with various modifications and improvements made based on the knowledge of those skilled in the art, including the embodiment described above. In addition, modification examples can also be configured using the technical elements described in the above embodiment. The configurations of the embodiments and the like may be combined and used as appropriate.

For example, the configuration of the electric compressor 1 including the stopper 41 is particularly highly useful for and is suitably applicable to a case where the electric compressor 1 randomly receives vibration or impact, such as an electric compressor installed in a vehicle or an aircraft. In addition, the configuration of the electric compressor 1 including the stopper 41 is applicable not only to an electric compressor installed in a vehicle or an aircraft, but also to a stationary electric compressor, as a measure against earthquake vibrations. In addition, in the above-described embodiment, the bearings 27 and 29 are angular contact ball bearings, however, the bearings 27 and 29 are not limited thereto, and may be deep groove bearings.

Figure 5A:
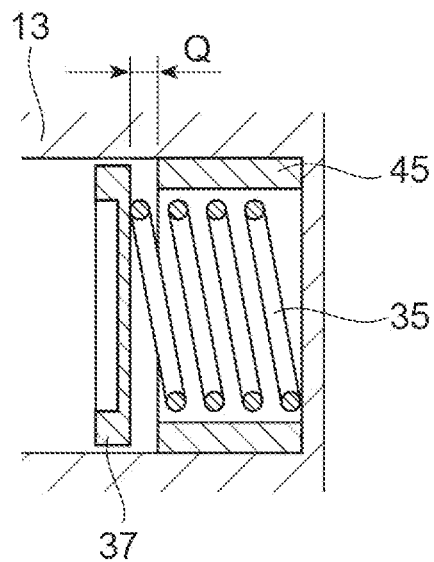
FIGS. 5A to 5C are cross-sectional views showing modification examples of the stopper.
Figure 5B:
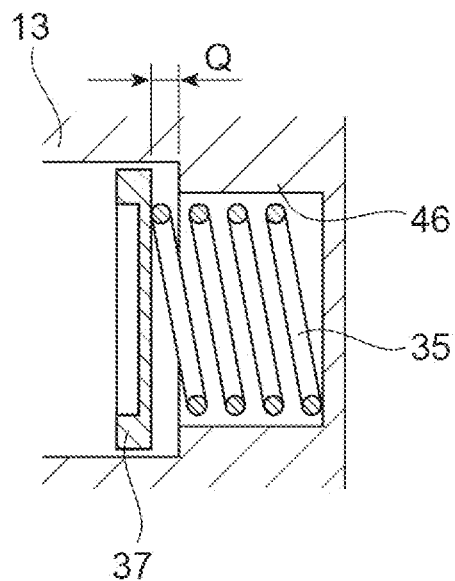
Figure 5C:
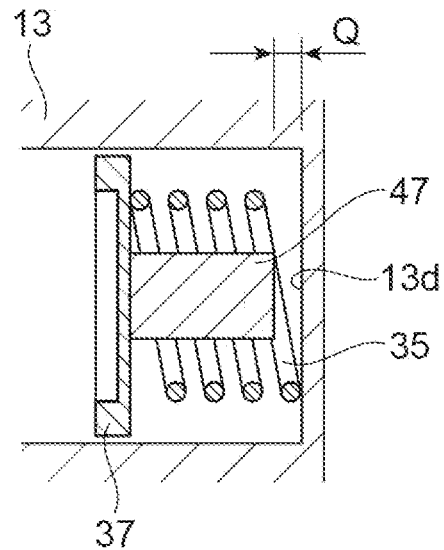

FIGS. 5A to 5C are cross-sectional views showing modification examples of the vicinity of the retainer 37. In FIGS. 5A to 5C, the vicinity of the retainer 37 in the initial state is shown, and components other than components required for description are not depicted. The stopper that restricts the displacement of the rotor 15 may be provided on the motor housing 13, and the displaced rotor 15 directly or indirectly interferes therewith. The stopper is not limited to the stopper 41 that is a retaining ring member. For example, instead of the stopper 41, as shown in FIG. 5A, a stopper 45 having a ring shape may be installed behind the retainer 37 along the inner peripheral surface of the motor housing 13. In addition, for example, as shown in FIG. 5B, a stopper 46 having a stepped shape which interferes with the retainer 37 behind the retainer 37 may be provided on the inner peripheral surface of the motor housing 13. In addition, the stoppers 41, 45, and 46 interfere with the retainer 37 (namely, the rotor 15 indirectly interfere with the stoppers 41, 45, and 46), however, the stopper may be configured such that the rotor 15 directly interferes therewith.

In addition, the stopper that restricts the displacement of the rotor 15 may be directly or indirectly provided on the rotor 15, and may displace together with the rotor 15 to interfere with the motor housing 13. As one example, for example, as shown in FIG. 5C, a stopper 47 protruding rearward may be provided on a rear surface side of the retainer 37. The stopper 47 is accommodated in a space of a hollow portion of the coil spring 35, and a rear end surface of the stopper 47 faces an inner wall surface 13d of the motor housing 13 with a gap interposed therebetween, the gap corresponding to the limit displacement amount Q. In addition, the stopper is not limited to the stopper provided on the retainer 37 (namely, the stopper indirectly provided on the rotor 15), and the stopper directly provided on the rotor 15 may interfere with an inner wall of the motor housing 13 or the like.

The invention claimed is:

1. An electric compressor comprising:
a housing accommodating a motor, wherein the housing comprises an abutting portion that protrudes inward in a radial direction from an inner peripheral surface of the housing and is located between the motor and an impeller in a rotation axis direction;
a rotor rotating around a rotation axis in the housing;
a pressurizing spring biasing the rotor in the rotation axis direction;
a rolling bearing that is interposed between the housing and the rotor, and comprises:
an inner ring holding the rotor; and
an outer ring biased by the pressurizing spring to abut against the abutting portion of the housing in the rotation axis direction; and
a stopper that prohibits the rotor from displacing beyond a predetermined limit displacement amount against a biasing of the pressurizing spring, and that allows the rotor to displace within the limit displacement amount,
wherein, when the rotor is displaced to the limit displacement amount, the pressurizing spring after being deformed has a height that is equal to or more than a closed height of the pressurizing spring.

2. The electric compressor according to claim 1,
wherein, the height L of the pressurizing spring after being deformed when the rotor is displaced to the limit displacement amount, a free height L0 of the pressurizing spring, and the closed height Lc of the pressurizing spring satisfy the following expression.

$$20\% \leq (L0-L)/(L0-Lc) \leq 80\%$$

3. The electric compressor according to claim 1,
wherein the limit displacement amount is smaller than a minimum shift amount at which the rolling bearing is dislocated when the inner ring and the outer ring of the rolling bearing are shifted in opposite way on the rotation axis direction.

4. The electric compressor according to claim 1,
wherein the rolling bearing is an angular contact ball bearing installed in a direction that supports a thrust force in a biasing direction of the pressurizing spring.

5. The electric compressor according to claim 1,
wherein, when the rotor is displaced to the limit displacement amount, the pressurizing spring after being deformed is in a state of maintaining an elastic repulsive force.

6. The electric compressor according to claim 1,
wherein the stopper is provided in the housing, and the displaced rotor directly or indirectly interferes with the stopper.

7. The electric compressor according to claim 6,
wherein the stopper is a retaining ring member that is fitted in a groove extending in a circumferential direction in an inner peripheral surface of the housing.

8. The electric compressor according to claim 1,
wherein the stopper is directly or indirectly provided on the rotor, and displaces together with the rotor to interfere with the housing.

9. An electric compressor comprising:
a housing accommodating a motor, wherein the housing comprises an abutting portion that protrudes inward in a radial direction from an inner peripheral surface of the housing and is located between the motor and an impeller in a rotation axis direction;
a rotor that comprises a rotation shaft and rotates around a rotation axis in the housing;
a pressurizing spring that biases the rotor in the rotation axis direction from a second end of the housing to a first end of the housing;
a first rolling bearing interposed between the housing and the rotor in a radial direction and biased by the pressurizing spring to abut against the abutting portion of the housing in the rotation axis direction,
a retainer interposed between the rotor and the second end of the housing in the rotation axis direction, and
a stopper that is interposed between the retainer and the second end of the housing in the rotation axis direction with a gap between the retainer and the stopper, wherein the gap corresponds a predetermined limit displacement amount of the rotor.

10. The electric compressor according to claim 9,
wherein, when the rotor is displaced to the limit displacement amount, the pressurizing spring after being deformed has a height that is equal to or more than a closed height of the pressurizing spring.

11. The electric compressor according to claim 9,
wherein, the height L of the pressurizing spring after being deformed when the rotor is displaced to the limit displacement amount, a free height L0 of the pressurizing spring, and the closed height Lc of the pressurizing spring satisfy the following expression.

$$20\% \leq (L0-L)/(L0-Lc) \leq 80\%$$

12. The electric compressor according to claim 9,
wherein, the first rolling bearing comprises:
an inner ring provided on a first small diameter portion of the rotor;
an outer ring biased by the pressurizing spring to abut against an abutting portion of the housing in the rotation axis direction, wherein the abutting portion protrudes inward in the radial direction from an inner peripheral surface of the housing; and
a bearing ball provided between the inner ring and the outer ring in the radial direction, and
wherein the limit displacement amount is smaller than a minimum shift amount at which the bearing ball of the first rolling bearing is dislocated when the inner ring and the outer ring are shifted in opposite way on the rotation axis direction.

13. The electric compressor according to claim 12,
wherein the inner ring of the first rolling bearing is interference-fitted to the first small diameter portion of the rotor, and
wherein the outer ring of the first rolling bearing is clearance-fitted to the inner peripheral surface of the housing.

14. The electric compressor according to claim 13,
wherein, the first rolling bearing further comprises an O-ring that extends in a circumferential direction and is sandwiched between an outer peripheral surface of the outer ring and the inner peripheral surface of the housing.

15. The electric compressor according to claim 9, further comprising a second rolling bearing interposed between the first rolling bearing and the retainer in the rotation axis direction,
wherein, the second rolling bearing comprises:
an inner ring provided on a second small diameter portion of the rotor, wherein an end surface of the inner ring abuts against a step of the second small diameter portion;

an outer ring that is slidable in the rotation axis direction with respect to an inner peripheral surface of the housing; and a bearing ball provided between the inner ring and the outer ring in the radial direction.

16. The electric compressor according to claim 15, wherein the inner ring of the second rolling bearing is interference-fitted to the second small diameter portion of the rotor, and wherein the outer ring of the second rolling bearing is clearance-fitted to the inner peripheral surface of the housing.

17. The electric compressor according to claim 15, wherein the retainer is interposed between the second rolling bearing and the stopper in the rotation axis direction, wherein the retainer comprises a protruding portion that protrudes in the rotation axis direction towards the outer ring of the second rolling bearing, and wherein the retainer is biased by the pressurizing spring to abut against the outer ring of the second rolling bearing.

18. The electric compressor according to claim 9, wherein the stopper has a ring shape and is interposed between the retainer and the second end of the housing in the rotation axis direction along an inner peripheral surface of the housing.

19. The electric compressor according to claim 9, wherein the stopper is a step provided on an inner peripheral surface of the housing between the retainer and the second end of the housing in the rotation axis direction.

20. An electric compressor comprising:

a housing accommodating a motor, wherein the housing comprises an abutting portion that protrudes inward in a radial direction from an inner peripheral surface of the housing and is located between the motor and an impeller in a rotation axis direction;

a rotor that comprises a rotation shaft and rotates around a rotation axis in the housing;

a pressurizing spring that biases the rotor in the rotation axis direction from a second end of the housing to a first end of the housing;

a first rolling bearing interposed between the housing and the rotor in a radial direction and biased by the pressurizing spring to abut against the abutting portion of the housing in the rotation axis direction, a retainer interposed between the rotor and the second end of the housing in the rotation axis direction, and a stopper that is interposed between the retainer and the second end of the housing with a gap between the stopper and the second end of the housing, wherein the gap corresponds a predetermined limit displacement amount of the rotor.

* * * * *